(12) United States Patent
Freiberger et al.

(10) Patent No.: US 9,011,070 B2
(45) Date of Patent: Apr. 21, 2015

(54) LOADING STATION FOR A STORAGE FRAME

(75) Inventors: Gerd Freiberger, Michelstadt Vielbrunn (DE); Peter Wiemer, Meerbusch (DE); Jürgen Reitz, Eschborn (DE); Manfred Waldstädt, Mainz (DE)

(73) Assignee: Poly-clip System GmbH & Co. KG, Hattersheim (DE)

(*) Notice: Subject to any disclaimer, the term of this patent is extended or adjusted under 35 U.S.C. 154(b) by 489 days.

(21) Appl. No.: 13/102,870

(22) Filed: May 6, 2011

(65) Prior Publication Data
US 2011/0276176 A1  Nov. 10, 2011

(30) Foreign Application Priority Data
May 6, 2010  (EP) .................................. 10004815

(51) Int. Cl.
| | |
|---|---|
| B65G 1/00 | (2006.01) |
| A22C 11/00 | (2006.01) |
| A47F 7/00 | (2006.01) |
| A22C 15/00 | (2006.01) |
| B62B 3/00 | (2006.01) |

(52) U.S. Cl.
CPC .............. A22C 15/007 (2013.01); B62B 3/006 (2013.01)

(58) Field of Classification Search
CPC ..... A22C 15/007; A22C 15/001; B65G 65/00
USPC .............. 211/60.1, 13.1; 414/331.06, 331.07, 414/331.08; 452/32, 51, 186
See application file for complete search history.

(56) References Cited

U.S. PATENT DOCUMENTS

| | | | | |
|---|---|---|---|---|
| 4,634,333 | A | * | 1/1987 | Butterly et al. .......... 414/331.07 |
| 5,129,162 | A | * | 7/1992 | Hemmersbach et al. ....... 34/284 |

(Continued)

FOREIGN PATENT DOCUMENTS

| | | |
|---|---|---|
| DE | 221 978 A1 | 5/1985 |
| DE | 221 978 B1 | 3/1987 |

(Continued)

OTHER PUBLICATIONS

EP 1 994 829 A1—English abstract and machine translation obtained from Espacenet (http://worldwide.espacenet.com) accessed on Apr. 20, 2012, 11 pages.

(Continued)

*Primary Examiner* — Daniel J Troy
*Assistant Examiner* — Kimberley S Wright
(74) *Attorney, Agent, or Firm* — Hahn Loeser & Parks LLP

(57) ABSTRACT

The present invention relates to a loading station for a storage frame. In the loading station, the storage frame serves for temporarily holding and transporting rod-like elements, in particular smoking rods, on which sausage-shaped products, like sausages, are stored, and comprises two side parts, wherein each side part has two supports being substantially parallel to each other and wherein the side parts are connected with each other by at least one cross beam, and horizontally arranged trays for accommodating rod-like elements. The loading station comprises at least one position defining device for defining a predetermined position of the storage frame. Moreover, at least one locking device is provided for releasably locking of the storage frame in its predetermined position.

9 Claims, 7 Drawing Sheets

(56) References Cited

U.S. PATENT DOCUMENTS

| | | | |
|---|---|---|---|
| 5,224,812 A * | 7/1993 | Oslin et al. | 414/401 |
| 5,329,952 A * | 7/1994 | Kojima et al. | 134/133 |
| 6,231,292 B1 * | 5/2001 | Wyssmuller et al. | 414/331.07 |
| 6,997,666 B1 * | 2/2006 | Rodgers et al. | 414/331.06 |
| 7,563,158 B2 * | 7/2009 | Haschke | 452/141 |
| 7,722,447 B2 * | 5/2010 | Haschke | 452/51 |
| 8,113,925 B2 * | 2/2012 | Reitz et al. | 452/48 |
| 8,262,105 B2 * | 9/2012 | Mead et al. | 280/33.992 |
| 2006/0035575 A1 | 2/2006 | Stimpfl | |
| 2007/0011868 A1 * | 1/2007 | Braun | 29/700 |
| 2007/0026776 A1 * | 2/2007 | Haschke | 452/32 |
| 2008/0317567 A1 * | 12/2008 | Rother et al. | 414/340 |
| 2009/0215367 A1 | 8/2009 | Haschke | |
| 2010/0124874 A1 * | 5/2010 | Reitz et al. | 452/37 |
| 2011/0081462 A1 * | 4/2011 | Meyrahn et al. | 426/231 |

FOREIGN PATENT DOCUMENTS

| | | | | |
|---|---|---|---|---|
| EP | 1 994 829 A1 | 11/2008 | | |
| FR | 2 926 015 A1 | 7/2009 | | |
| GB | 2 247 150 A | 2/1992 | | |
| GB | 2247150 | * | 2/1992 | A22C 15/007 |

OTHER PUBLICATIONS

Machine Translation of DD 221 978 A1, May 8, 1985 using Google Translate, 3 pgs.

Abstract and EPO Machine Translation of FR 2 926 015 A1 obtained from Espacenet on Oct. 13, 2011, 6 pgs.

* cited by examiner

LOADING STATION FOR A STORAGE FRAME

This application claims priority to, and the benefit of, European Patent Application No. 10 004 815.6-1260 filed May 6, 2010, which is hereby incorporated by reference.

BACKGROUND OF THE INVENTION

The present invention relates to a loading station for a storage frame wherein the storage frame serves for temporarily holding and transporting rod-like elements, in particular smoking rods, on which sausage-shaped products, like sausages, are stored.

In an already known production line for producing sausage-like products, like sausages, a filling tube is provided for feeding a packing material or tubular casing, respectively, with, for example sausage meat, wherein the tubular casing is closed at one end facing in the filling direction by a first clip. After the filling operation is concluded, the tube-like casing is finally closed by a second clip. If the sausage is later to be hung up, for example for the purposes of smoking or storage, a suspension loop is fed thereto in such a way that, when the first or second clip is attached, it is embraced by the respective clip and is thus secured to the sausage. The term loops in accordance with this invention is used to denote all at least partially flexible means, by way of which articles can be hung up.

After the filling process, the sausage-like products can be subjected to further processing. In the case of sausages as the sausage-like products, this could be a smoking process for the purpose of which the sausages are brought into a smoking chamber. For this, the sausages have to be transported to the end of a conveyor and there taken over by an automatic hanging line, in which the sausages are hung up on a rod-like element, such as a smoking rod, at their loops one after another in such a way that, as far as possible, they do not touch each other. Afterwards, the smoking rods are transported to a storage frame which would have rollers for transporting the storage frame with the smoking rods into the smoking chamber. In this conjunction, a robotic device can be provided for removing the smoking rods from the storage frame and/or inserting the smoking rods into the storage frame.

A robotic device being part of an automatic sausage production line for inserting or removing rod-like elements into or from a storage frame is known from EP patent application 1 994 829.

In the production of sausage-like products using a production line, there can be a great variety of machines being components of the respective production line. Said machines may vary in their size, in the rate of production or in the size of products to be manufactured. Moreover, there can also be a variation as to the kind of used rod-like elements on which the sausage-like products are to be stored, and the kind of storage frames to which the rod-like elements are to be fed or from which they have to be removed. Even if identical rod-like elements are used, depending on the kind of sausage-like products and their further treatment, like smoking or boiling for sausages as sausage-like products, it might be necessary that the rod-like elements together with the sausage-like products hanging thereon, have to be placed at specific positions inside a storage frame. As already mentioned, there can also be used a great variety of storage frames, wherein these storage frames may be standardized with regard to their geometrical dimensions or may also be produced individually or a combination of both types of storage frames can be used.

Subject to the manufacturer of the storage frames, the storage frames may vary in size regarding the above-mentioned geometrical dimensions. Moreover, in use, storage frames may be damaged, individually adapted or repaired. Thus, the tray rails on which the rod-like elements are to be placed, may be modified and their position may be changed.

While inserting a rod-like element together with the sausage-like products hanging thereon into a storage frame on a so-called loading station, said rod-like element may butt against the storage frame since, for example, the size of said storage frame has been modified due to adaption, repair or damage. As a result thereof, the sausage-like products may fall off the smoking rod or may be destroyed. This can in particular happen, if a robotic device is used for inserting rod-like elements into or removing them from the storage frame, since a robotic device operates automatically based on a software program.

BRIEF SUMMARY OF THE INVENTION

Therefore, it is an object of the present invention to provide a loading station, with which a correct insertion and removal of rod-like elements into or from storage frame free of damages is assured.

The aforesaid object is achieved by the features of claim 1. Advantageous configurations of the invention are described in claims 2 to 9.

In the present invention, the loading station for a storage frame, wherein the storage frame serves for temporarily holding and transporting rod-like elements, in particular smoking rods, on which sausage-shaped products, like sausages, are stored, and comprises two side parts, wherein each side part has two supports being substantially parallel to each other and wherein the side parts are connected with each other by at least one cross beam, and horizontally arranged trays for accommodating rod-like elements, comprises at least one position defining device for defining a predetermined position of the storage frame and at least one locking device for releasably locking of the storage frame in its predetermined position.

According to the invention, the storage frame which is loaded and/or unloaded by a robotic device has to be positioned at a predetermined position such that the robotic device can insert the rod-like elements into the storage frame and/or remove the rod-like elements from the storage frame without damages to the sausage-shaped products hanging on the rod-like elements. If the storage frame is not positioned in its predetermined position since the robotic device operates automatically based on a software program and can not adapt a change in the position of the storage frame without changing the software program, the rod-like element may butt against the storage frame. As a result thereof, the sausage-like products may fall off the smoking rod or may be destroyed. According to the invention, the storage frame is positioned by a position defining device and locked in its predetermined position by the locking device such that the rod-like elements can be removed from and/or inserted into the storage frame without butting against the storage frame, that means without damages.

Preferably, the locking device comprises at least one lever which is pivotable between a locking position, in which it locks the storage frame, and an unlocked position, in which the storage frame is unlocked. The storage frame is moved by an operator to the loading station. On the loading station, the robotic device inserts rod-like elements into the storage frame, the storage frame being in its predetermined position.

Several locking devices, especially four levers are provided for locking the storage frame in its predetermined position.

According to an embodiment, a sensor is provided detecting the storage frame being positioned in its predetermined position. As soon as the sensor detects the storage frame, the locking device is automatically activated for locking the storage frame. That means the locking device, in particular the lever, is deviated into its locked position, in which the storage frame is locked. Since the locking device is activated by a signal of a sensor, no operator is necessary for locking the storage frame.

Preferably, at least one straightening device is provided for straightening the storage frame while the storage frame is moved into its predetermined position. Due to the handling and in particular due to the exposure to high differences in temperature, the storage frame may be warped. This can lead to problems in removing and/or inserting of rod-like elements by a robotic device, since the robotic device can not adapt a change in the position of the storage frame without changing the software program of the robotic device. Because of the straightening of the storage frame which is conducted while the storage frame is moved into its predetermined position, the robotic device can remove and/or insert rod-like elements without damages.

The straightening device can comprise a guidance for receiving the support of the storage frame. The guidance is arranged in the direction of movement of storage frame such that the support of storage frame is received by the guidance while the storage frame is moved into its predetermined position.

The guidance of the straightening device preferably comprises an insertion aid for easily inserting the support of the storage frame. In particular, the insertion aid is formed by a tapered channel.

According to an embodiment, the locking device is formed such that it urges the storage frame towards the straightening device. For example, the locking device is a lever urging the storage frame into a tapered channel of a guidance being part of the straightening device.

Preferably, the position defining device is part of a framework with two side parts and a cross beam. The storage frame is moved into the framework. The framework comprises lateral guidances which the side parts of the storage frame engages in moving the storage frame into the framework and a beam arranged vertical to the lateral guidances which forms a stop for the storage frame.

At least one light barrier can be provided for detecting the storage frame and a robotic device for removing rod-like elements from and/or inserting rod-like elements into the storage frame. As soon as the robotic device is moved, a removal of the storage frame from its loading position is not possible such that an injury of an operator is prevented. In particular, the light barrier is a longitudinal light grid.

According to the preferred embodiment, the light bather is provided on the front side of the framework facing the robotic device and a lockable door is provided on the back side of the framework facing away from the robotic device and forming the side from which the storage frame is inserted. The door is locked until the insertion and/or removal of rod-like elements by the robotic device is determined. After the determination of the insertion and/or removal by the robotic device, the door is unlocked and an operator can remove the storage frame out of the loading position.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
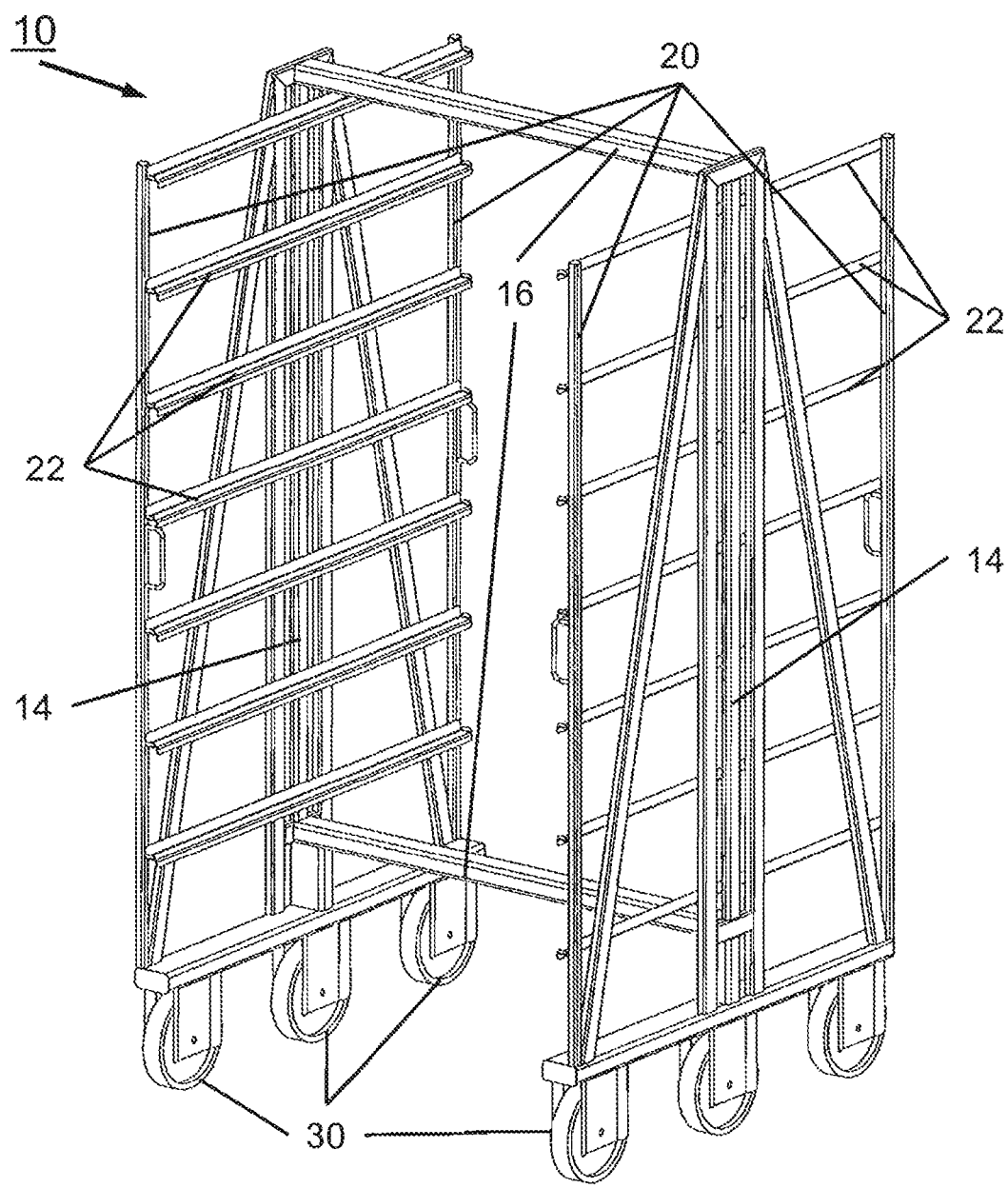
FIG. 1: is a schematic and perspective view to a storage frame of a generally known kind, for at least temporarily storing rod-like elements like smoking rods.

FIG. 1 shows a storage frame 10 of a generally known kind. Storage frame 10 comprises two frame elements or side parts 12 which are arranged parallel to each other in the Bottom region of storage frame 10. Two vertically arranged posts 14, each extending upwardly from the centre of side parts 12 are coupled to each other by two horizontal cross beams 16, one in the lower region of posts 14 and the second at their upper ends. At each end of side parts 12, vertical rods 20 are arranged parallel to posts 14 and of the at least approximately same length. Between each pair of vertical rods 20 attached to the same side part 12, trays 22 are horizontally arranged. Each tray 22 arranged at one pair of vertical rods 14 is horizontally and parallel aligned to a tray 22 attached to the second pair of vertical rods 20, forming a storage plane to which a rod-like element, like a smoking rod, may be stored. Below side parts 12, transportation wheels 30 are arranged to allow storage frame 10 to be moved manually by an operator or automatically by a respective drive system.

Figure 2:
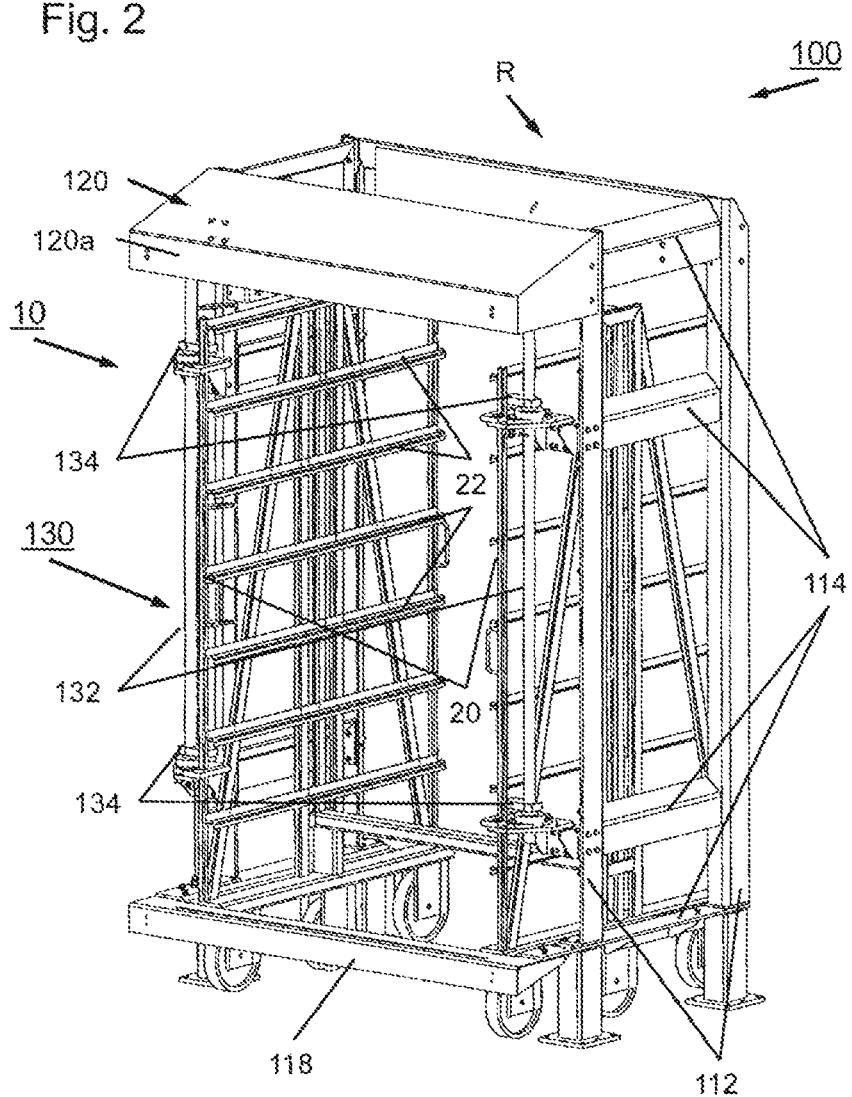
FIG. 2: is a schematic and perspective view to a loading station according to the present invention.

FIG. 2 is a schematic and perspective view to a loading station according to the present invention with a storage frame 10 positioned therein. Loading station 100 comprises a framework 110 including four vertically arranged corner posts 112 coupled by a number of vertically arranged side beams 114, a horizontal rear side beam 116, a first, horizontal upper front beam 120 and a second, lower front beam 118. Lowermost side beams 114 are mounted to corner posts 112 at a height which corresponds to the height of side parts 12 of storage frame 10. Rear beam 116 and first front beam 120 are attached to the upper ends of corner posts 112. Second front beam 118 is coupled to the lower ends of the two corner posts 112 facing the front side F of loading station 100 at a height corresponding to the height of side parts 12 of storage frame 10. As it can be inferred from FIG. 2, lowermost side beams 114 and lower front beam 118 act as a positioning device for positioning storage frame 10 in a loading or unloading position in loading station 100.

Figure 3:
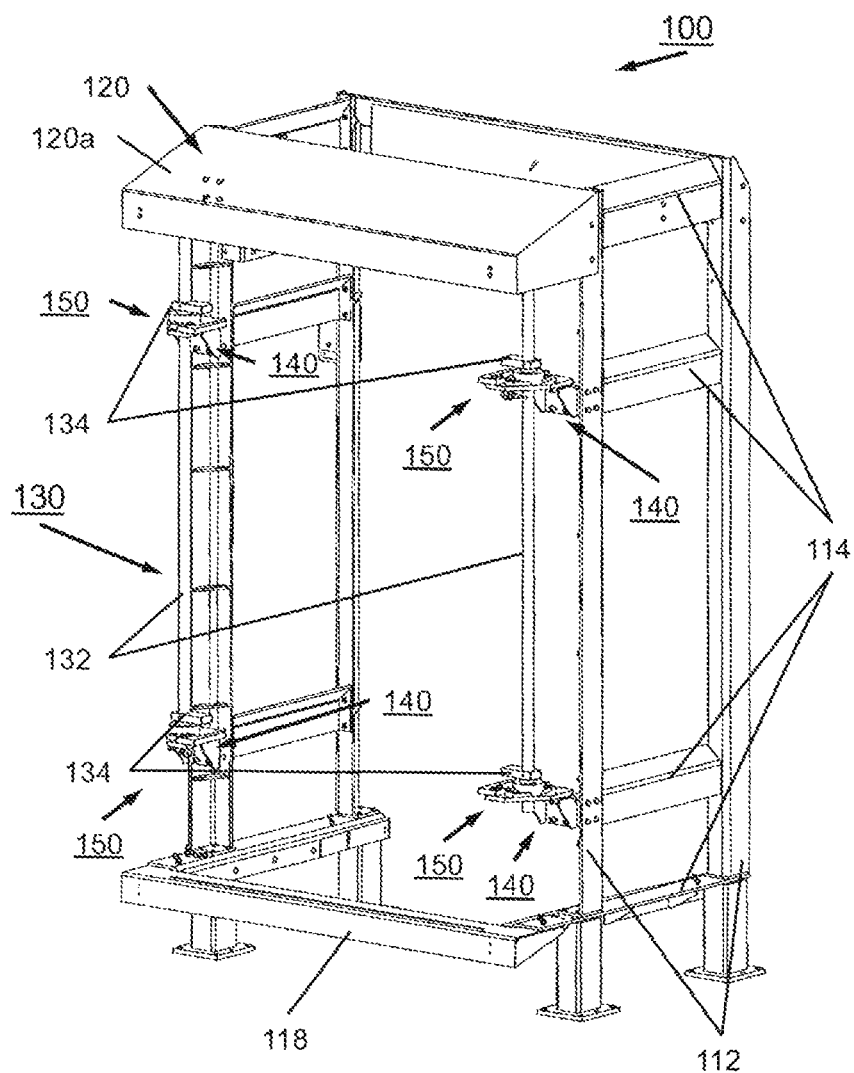
FIG. 3: is a schematic and perspective view to the loading station of FIG. 2, wherein, for clarification matters the storage frame has been left.

Referring to FIG. 3, there is shown a schematic and perspective view to the loading station of FIG. 2 wherein, for clarification matters the storage frame 10 has been left. As it can be seen there, loading station 100 further comprises two locking devices 130 each of which is attached to one of the two corner posts 112 facing the front side F of loading station 100. Each of the two locking devices 130 comprises a vertically arranged pivot axle 132 extending from the lower region of corner post 112 to its upper, end and terminates inside a housing 120a of upper front beam 120. At the lower end of pivot axle 132 and in an upper region below housing 120a of upper front beam 120, pivot levers 134 are fixedly attached to pivot axle 132 to be pivotal together with pivot axle 132. Pivot axles 132 are held in pivot bearings 136 attached to the respective corner post by an attachment unit 140 which will be described in detail in conjunction with FIGS. 5 and 6 below. A pivot drive (not shown) is coupled to the upper ends of both pivot axles 132. Pivot levers 132 according to FIGS. 2 and 3, are in their locking position. That means that pivot levers 32 are aligned parallel to front side F of loading station 100 and that pivot levers 132 of the first and second locking device 130 facing towards pivot lever 132 of the second and first locking device 132, respectively. In their locking position, pivot levers 132 engage the vertical rods 20 which are directed to front side F of loading station 100 of storage frame 10 from the rear side R. In an unlocking position (not shown), pivot levers 132 are pivoted about an angle of at least approximately 90° to be directed towards rear side R of loading station 100.

Moreover, as it can further be seen in FIG. 3, loading station 100 further comprises a straightening device, consisting of four straightening units 150 which will be described in detail in conjunction with FIGS. 5 to 7. Each straightening unit 150 is held by one of the attachment units 140.

Figure 4:
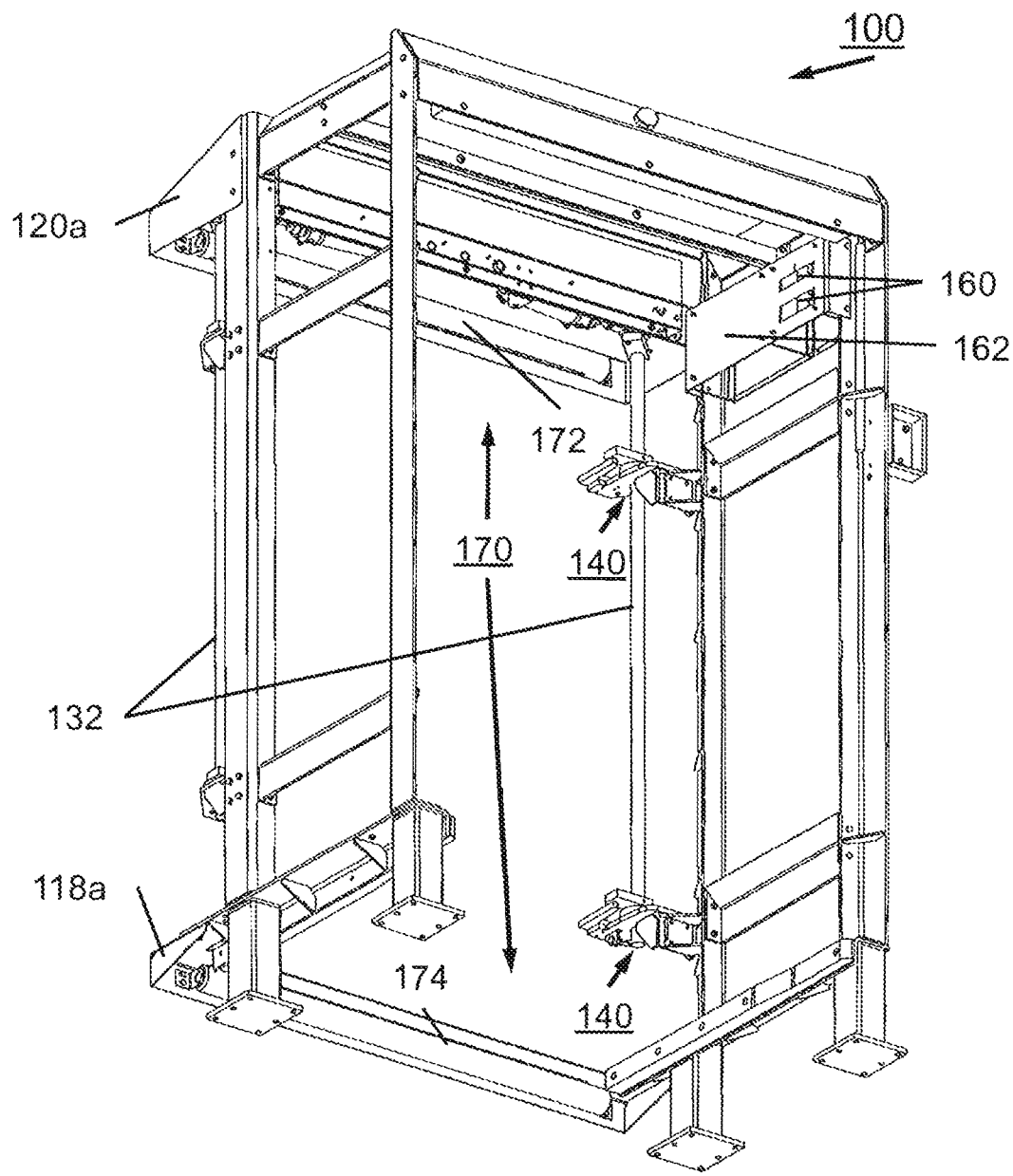
FIG. 4: is a schematic and perspective view to the loading station of FIG. 3 seen from its rear side in an upward direction.

FIG. 4 is a schematic and perspective view to the loading station 100 seen from its rear side R in an upward direction. In the upper region between the right pair of corner posts 112 (according to FIG. 4), sensor elements 160 are arranged covered by a housing 162 for sensing the presence or absence of a storage frame inside loading station 100.

A light barrier 170 is arranged in the region of front side F of loading station 100. Light barrier which in the present embodiment is a light grid, consists of an emitter unit 172 accommodated in housing 116 and a receiver unit 174 attached to second front beam 120. Light barrier or light grid 170 forms an approximately rectangular detector plane for detecting e.g. a robotic device while loading or unloading smoking rods from storage frame 10. Sensor elements 160 and light grid 170 may be coupled to a control unit of loading station 100 and/or a control unit of the robotic device for e.g. stopping a loading or unloading process in case of the absence of a storage frame or an unintended engagement of the loading station by a person.

Figure 5:
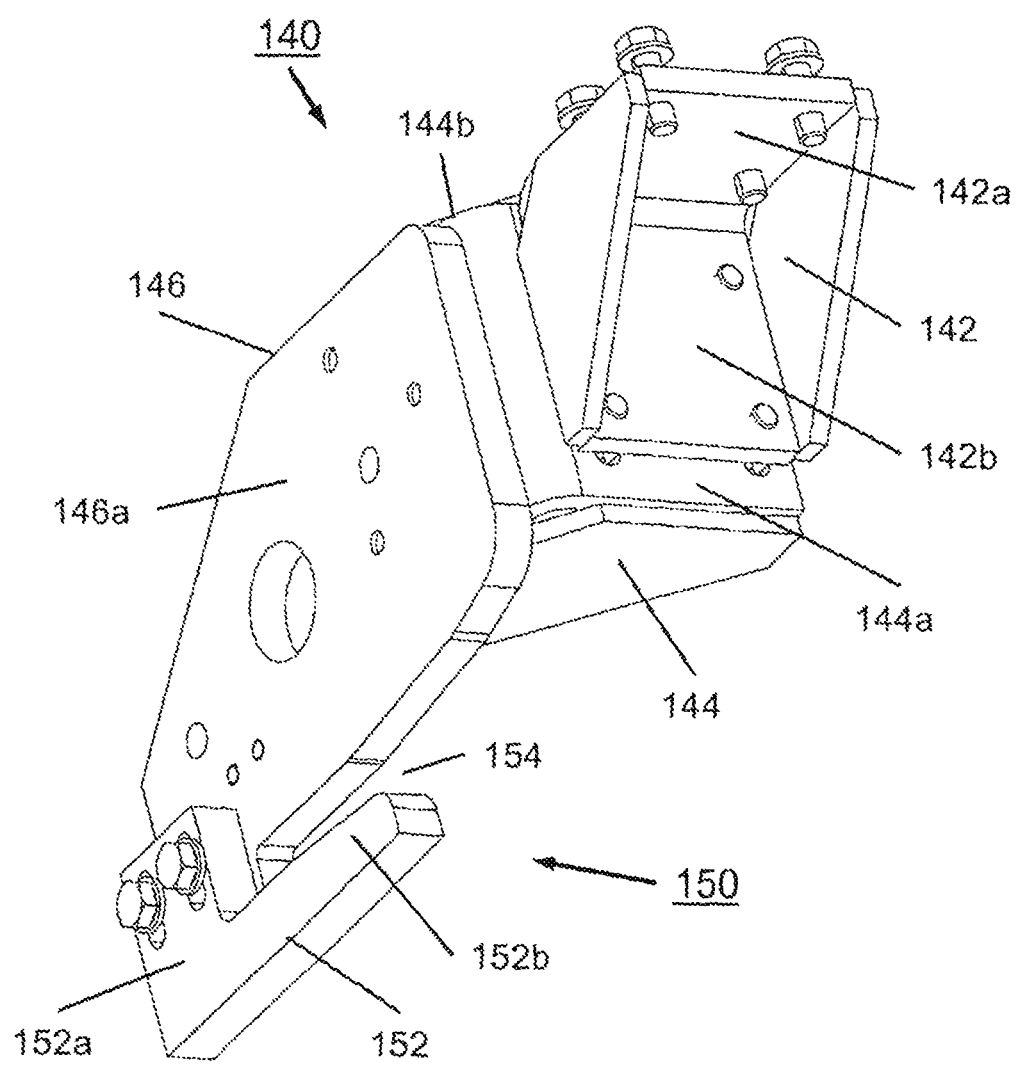
FIG. 5: is a schematic and perspective view to an attachment unit including a straightening unit according to the present invention.

FIG. 5 is a schematic and perspective view to an attachment unit 140 including a straightening unit 150. Attachment unit 140 comprises a first bracket 142 having first and second wall elements 142a, 142b, a second bracket 144 having first and second wall elements 144a, 144b and a mounting plate 146. Brackets 142, 144 are coupled to each other by their sidewalls 142b, 144a. Mounting plate 146 having top and bottom surfaces 146a, 146b, is coupled to second wall 144b by its bottom surface 146b.

A substantially L-shaped straightening element 152 having a base part 152a and an arm 152b, is attached to the lower left corner C of mounting plate 146 (according to FIG. 5) at top surface 146a of mounting plate 146 by base part 152a. Arm 152b of L-shaped straightening element 152 together with mounting plate 146, forms a channel 154 there between. Channel 154 tapers from the free end of arm 152b towards base part 152a which closes channel 154 at this end.

Figure 6:
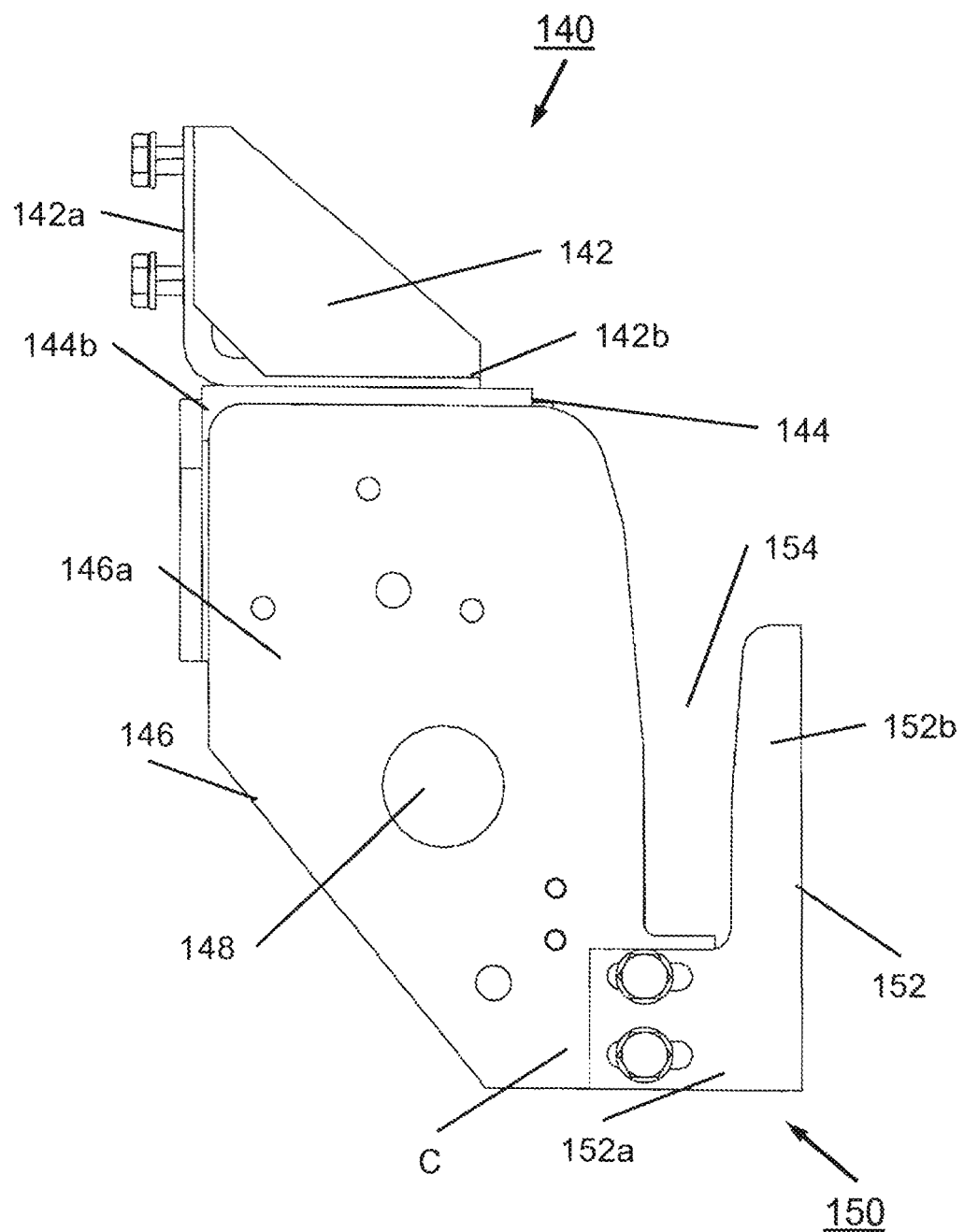
FIG. 6: is a top view to attachment unit of FIG. 5.

FIG. 6 is a top view to attachment unit 140 showing tapering channel 154 formed by Arm 152a and mounting plate 146. As it can be inferred in conjunction with FIG. 2 to 4, attachment unit 140 is mounted to the respective corner posts 112 of loading station 100 by first wall 142a of first bracket 142 in a manner that mounting plate 40 is horizontally aligned. Channel 154 is directed from Frond side F towards rear side R. Thereby, its open end faces rear side R. Mounting plate 146 further comprises a bore 148 through which pivot axle 132 is guided and pivotal held.

Figure 7:
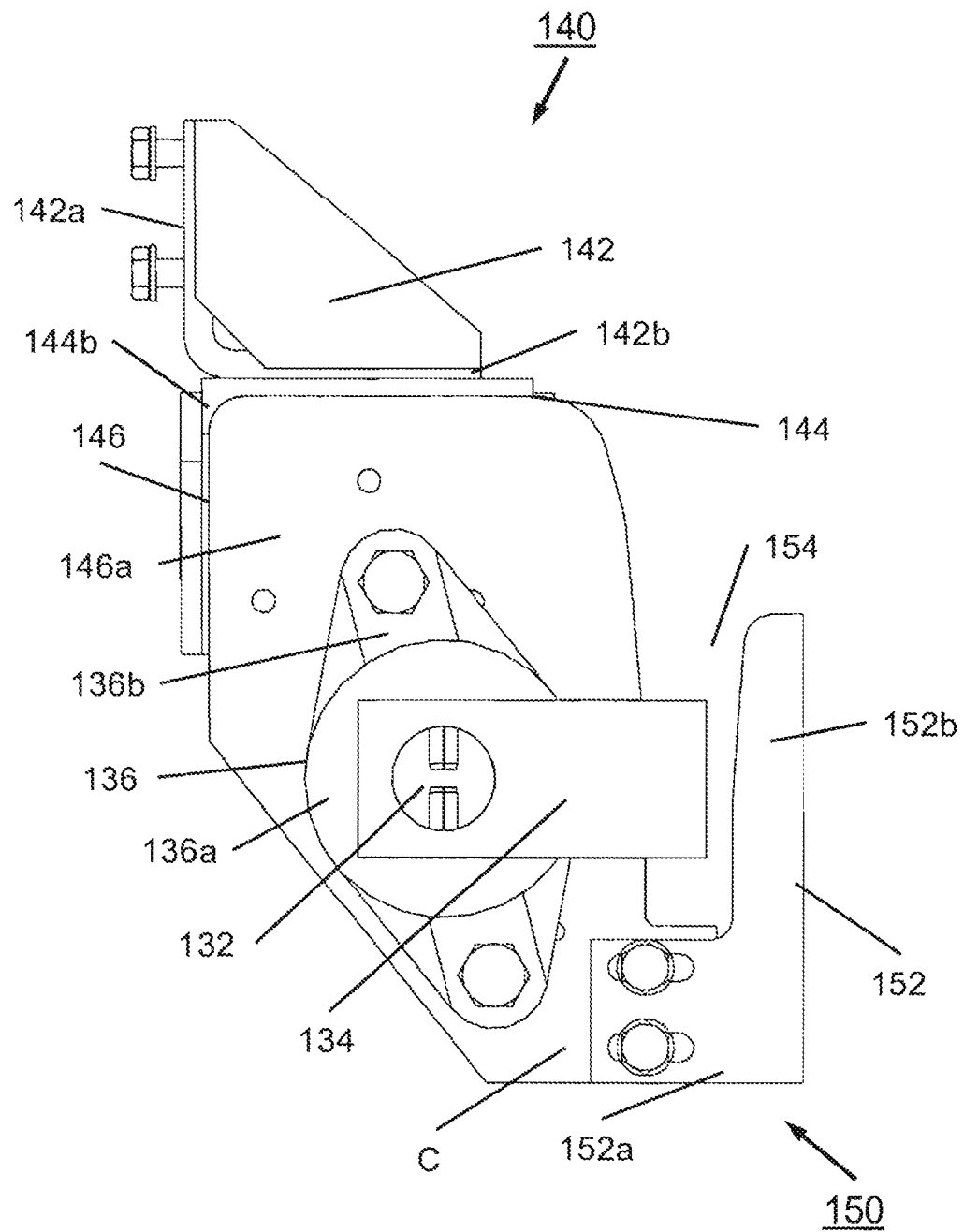
FIG. 7: is a top view to attachment unit of FIGS. 5 and 6 including a locking device.

FIG. 7 is a top view to attachment unit 140 of FIG. 6, additionally including a bearing 136 for pivotal holding pivot axle 132. Bearing 136 comprises a bearing member 136a for pivotal bearing pivot axle 132 and a mounting member 136b for mounting bearing 136 to mounting plate 146. Pivot lever 134 fixedly mounted to pivot axle 132 by respective fixing means like fixing pins 132a, is in its locking position. In this position, levers 134 closes the open end of channel 154 and fixes a storage frame 10 positioned in loading station 100 by preventing storage frame 10 locked in channel 154 with one of its vertical rods 20 from being removed.

For releasing storage frame 10 from loading station 100, pivot lever 134 pivots into its unlocking position. According to FIG. 7, pivot lever has to be turned counterclockwise about an angle of approximately 90° to be vertically arranged parallel to arm 152b of straightening element 152.

As already mentioned above, in the production of sausage-like, like sausages, products using a clipping machine and an automatic hanging line, said sausages have to be transported by a conveyor out of the clipping machine and have to be taken over by an automatic hanging line, in which the sausages are hung up on a rod-like element, such as a smoking rod, at their loops one after another in such a way that, as far as possible, they do not touch each other. Afterwards, the smoking rods are transported e.g. by a robotic device to a storage frame 10 in which the smoking rods together with the sausages hanging thereon, are at least temporarily stored, the storage frame together with the smoking rods may be transported to a further treatment station, like a smoking chamber.

For loading or unloading the smoking rods from or to a storage frame 10, said storage frame 10 has to be moved to and positioned in loading station 100. Storage frame 10 is shifted into loading station 100 from its rear side R until storage frame 10 abuts lower or second front beam 120, to be positioned in a direction towards front side F of loading station 100. A sideward alignment of storage frame is achieved by side beams 114 of loading station 100, which have a distance to each other corresponding to the width of storage frame 10.

While inserting storage frame 10 into loading station 100 from its rear side R, vertical rods 20 facing front side F of loading station 100, are positioned in channels 154 of straightening units 150. Sensor elements 160 detect the presence of storage frame 10 in loading station 100 and causing pivot levers 134 of locking device 130 to be pivoted from their unlocking position into their locking position. Thereby, pivot levers 134 locking vertical rods 20, holding storage frame 10 in its predetermined position and preventing storage frame 10 from being moved during the loading process.

During handling, storage frame 10 may be slightly deformed. Such deformed storage frames do not need to be repaired immediately. Said slightly deformations may be balanced by straightening units 150. While shifting storage frame 10 into loading station 100, vertical rods 20 of storage frame 10 are inserted into channels 154. Since channels 154 are of a tapering shape, vertical rods 20 of slightly deformed storage frames 10 are urged into channels 154. Thereby said storage frame 10 is straightened. Additionally, the insertion of vertical rods 20 into channels 154 may be supported by pivoting levers 134 from their unlocking position into their locking position.

A door (not shown) is attached to rear side R of loading station 100 including a sensor for detecting the door at least in its closed position. In an easy case, the door may be formed by a single, horizontal bar. Light grid 170 covering front side F of loading station 100 detects the robotic device loading a smoking rod to storage frame 10. In case, that the door sensor detects the door in its open position, light grid is activated to shut down the robotic device if detected by light grid 170.

After a predetermined number of smoking rods are loaded to storage frame 10, storage frame 10 is removed from loading station 100 and next, empty storage frame 10 is moved into loading station 100.

Loading station 100 has been described as to be used to load smoking rods or the like together with sausage-shaped products hanging thereon to an empty storage frame 10 positioned in loading station 100. Naturally, loading station 100 may also be used to unload smoking rods or the like from storage frame 10.

Position defining device including side beams 114 and front beam 118 and locking device 130 are described as being separate, independent devices. It is also possible to combine both devices in a common positioning and locking unit. In a simple embodiment, such a common positioning and locking unit may include front and side beams 114, 118 and pivot levers positioned in the rear side R adjacent to side beams 114. Alternatively, pins may be shifted into a frame element of storage frame 10, acting as centering and fixing means.

Pivot levers 134 are coupled in pairs to common pivot axles 132 supported by mounting plate 146 being part of straightening units 150. Locking device 130 and straightening units 150 may also be separate devices acting independently for each other.

Locking device 130 may also comprise other locking means than levers 134, like claws or the like.

Moreover, locking device 130 and straightening units 150 have been described as being positioned at front side R of loading device 100 for engaging vertical rods 12 of storage frame 10 facing front side F. An additional locking device 130 and additional straightening units 150 may be provided at the rear side R of loading station 100 for engaging vertical rods 12 of storage frame 10 facing rear side R of loading station 100.

According to the present embodiment of loading station 100, locking device 130 and straightening units 150 are fixedly mounted to corner posts 112 of loading station 100. Alternatively, locking device 130 and straightening units 150 may also be pivotal mounted to corner posts 112 of loading station 100. In this case, locking device 130 and straightening units 150 may be pivoted towards storage frame 10 when positioned in loading station 100.

The invention claimed is:

1. A loading station for a storage frame, wherein the storage frame serves for temporarily holding and transporting rod-like elements, in particular smoking rods, on which sausage-shaped products, like sausages, are stored, and wherein the storage frame comprises:

two side parts, wherein each side part has two vertical rods and two supports being substantially parallel to each other, and wherein the side parts are connected with each other by at least one cross beam, and horizontally arranged trays for accommodating rod-like elements, the loading station comprising:
at least one position defining device positioned in a configuration to define a predetermined position of the storage frame,
at least one locking device configured to releasably lock the storage frame in its predetermined position,
at least one light barrier positioned in a configuration to detect the storage frame and a robotic device for removing rod-like elements from and inserting rod-like elements into the storage frame,
a sensor positioned in a configuration to detect the storage frame being positioned in its predetermined position,
wherein the loading station is configured to receive a storage frame,
wherein, in the predetermined position, the storage frame is arranged within the loading station, and
wherein the locking device is configured to engage the two vertical rods of the storage frame which are directed to the front side of the loading station, when the storage frame is shifted into the loading station from the rear side of the loading station.

2. The loading station according to claim 1, wherein the locking device comprises at least one lever which is pivotable between a locking position, in which it locks the storage frame, and an unlocked position, in which the storage frame is unlocked.

3. The loading station according to claim 1 further comprising:
at least one straightening device configured for straightening the storage frame while the storage frame is moved into its predetermined position.

4. The loading station according to claim 3,
wherein the straightening device comprises a guidance for receiving one or more of the two supports of the storage frame.

5. The loading station according to claim 4,
wherein the guidance of the straightening device comprises an insertion aid for easily inserting the support of the storage frame.

6. The loading station according to claim 5,
wherein the insertion aid is formed by a tapered channel.

7. The loading station according to claim 3,
wherein the locking device is formed such that it urges the storage frame towards the straightening device.

8. The loading station according to claim 1,
wherein the position defining device is part of a framework with two side parts and a cross beam.

9. The loading station according to claim 1, where the storage frame comprises:
two side parts, wherein each side part has two supports being substantially parallel to each other and wherein the side parts are connected with each other by at least one cross beam, and horizontally arranged trays configured to accommodate rod-like elements.

* * * * *